United States Patent [19]
Arai

[11] Patent Number: 6,167,121
[45] Date of Patent: Dec. 26, 2000

[54] MODEM APPARATUS

[75] Inventor: Yasuhiro Arai, Kawasaki, Japan

[73] Assignee: Fujitsu Limited, Kawasaki, Japan

[21] Appl. No.: 09/098,618

[22] Filed: Jun. 17, 1998

[30] Foreign Application Priority Data

Dec. 19, 1997 [JP] Japan ................................. 9-351672

[51] Int. Cl.⁷ .............................................. H04M 11/00
[52] U.S. Cl. ................................ 379/93.05; 379/93.28; 379/90.01
[58] Field of Search ........................ 379/90.01, 93.28, 379/93.31, 142, 373, 377; 375/222

[56] References Cited

U.S. PATENT DOCUMENTS

| | | | |
|---|---|---|---|
| 4,570,034 | 2/1986 | Serrano | 379/373 |
| 5,131,025 | 7/1992 | Hamasaki | 379/93.02 |
| 5,442,694 | 8/1995 | Chitrapu et al. | 379/373 |
| 5,655,010 | 8/1997 | Bingel | 379/412 |

FOREIGN PATENT DOCUMENTS

5-268372  10/1993  Japan.

*Primary Examiner*—Curtis A. Kuntz
*Assistant Examiner*—M. Ramakrishnaiah
*Attorney, Agent, or Firm*—Staas & Halsey LLP

[57] ABSTRACT

A modem apparatus performs modulation and demodulation between a telephone circuit and a terminal apparatus. The modem apparatus includes a modem circuit, and a codec circuit performing conversion between an analog signal and a digital signal. Capacitors are provided between the modem circuit and the codec circuit, a signal supplied from the terminal apparatus and a signal supplied from the codec circuit being supplied to the modem circuit, and a signal supplied from the telephone circuit and a signal supplied from the modem circuit being supplied to the codec circuit.

11 Claims, 11 Drawing Sheets

MODEM APPARATUS

BACKGROUND OF THE INVENTION

1. Field of the Invention

The present invention relates to a modem apparatus which is provided between a telephone circuit and a terminal apparatus, and, in particular, to a modem apparatus in which direct-current insulation is performed between the telephone circuit and the terminal apparatus.

2. Descriptions of the Related Art

A modem apparatus for an analog circuit is provided between a telephone circuit and a terminal apparatus. A signal supplied from the terminal apparatus is converted into a signal which is suitable for signal transmission through the telephone circuit, and the thus-obtained signal is sent to the telephone circuit. A signal supplied from the telephone circuit is converted into a digital signal which can be easily processed by the terminal apparatus, and the thus-obtained signal is sent to the terminal apparatus.

Generally, in such a modem apparatus, direct-current insulation should be provided between the telephone circuit and the terminal apparatus so that a transmission circuit network is prevented from being damaged. A JATE (Japan Approvals Institute for Telecommunication Equipment) Standard prescribes that 'the withstand voltage should be equal to or higher than 250 V' as a Japanese standard. In the United States of America, FCC (Federal Communication Commission) 68 standard prescribes that 'the withstand voltage should be equal to or more than 1500 V'.

In order to fulfill these standards, such a modem apparatus normally includes a 'circuit transformer' for withstanding the above-mentioned withstand voltage.

Figure 1:
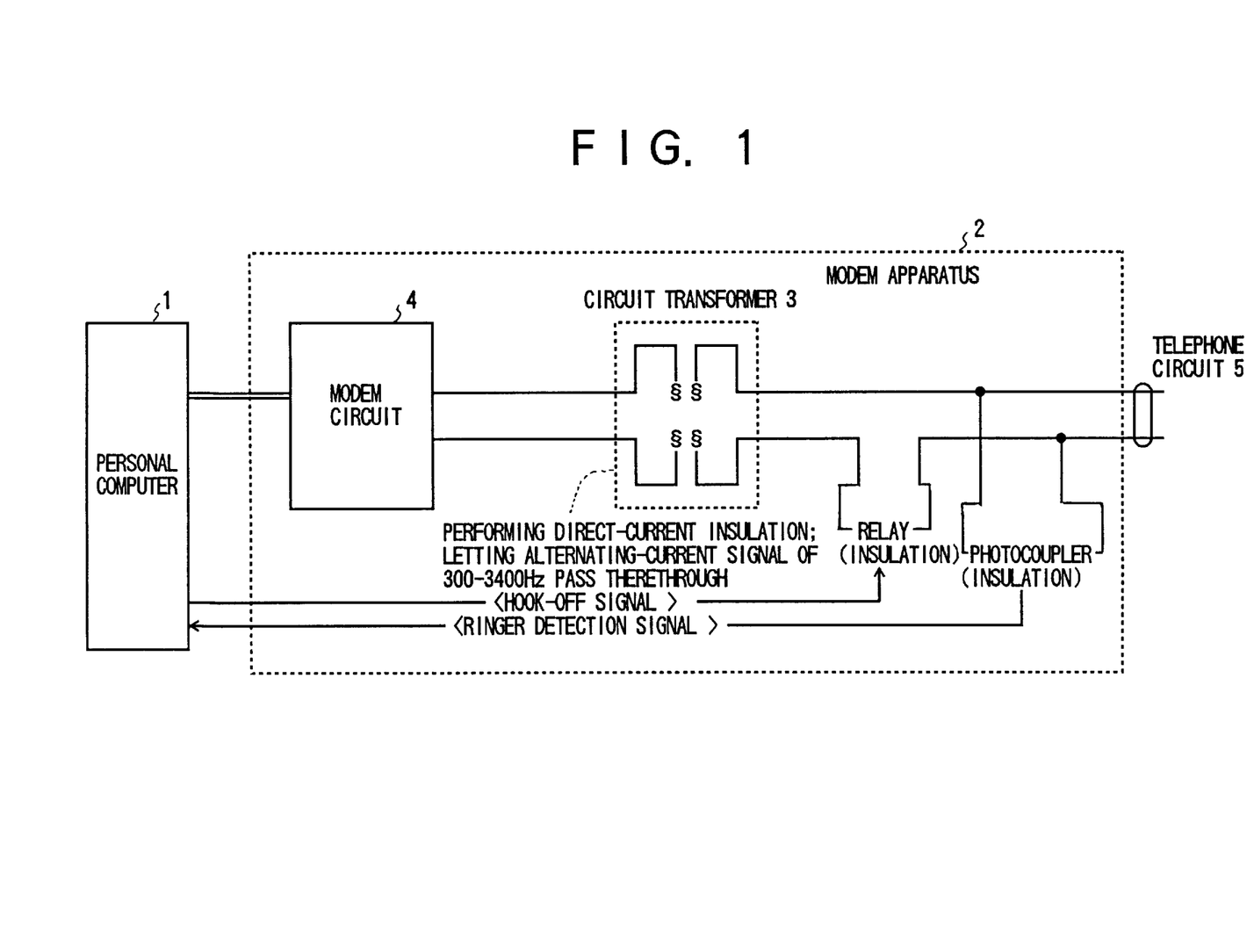
FIG. 1 illustrates an arrangement of a modem (wherein direct-current insulation is performed by a circuit transformer) in the related art.

FIG. 1 shows an example of such a modem apparatus in the related art in which the direct-current insulation is performed by such a circuit transformer. A signal supplied from a personal computer 1 (the terminal apparatus) is transmitted to the telephone circuit 5 via the modem apparatus 2. The modem apparatus 2 includes a modem circuit 4, a circuit transformer 3, a relay and a photocoupler. The circuit transformer 3 is used for providing a necessary direct-current insulation. The modem apparatus includes a hook-off/on control circuit. (Although a hook-off signal itself is generated by the personal computer 1, the modem apparatus 2 processes the signal.) The modem apparatus 2 controls the connection with the telephone circuit 5 by controlling the relay in accordance with the hook-off signal. The modem apparatus 2 further includes a ringer-signal detecting circuit which detects a ringer signal through the photocoupler and the thus-detected signal is transferred to the personal computer 1.

Figure 2:
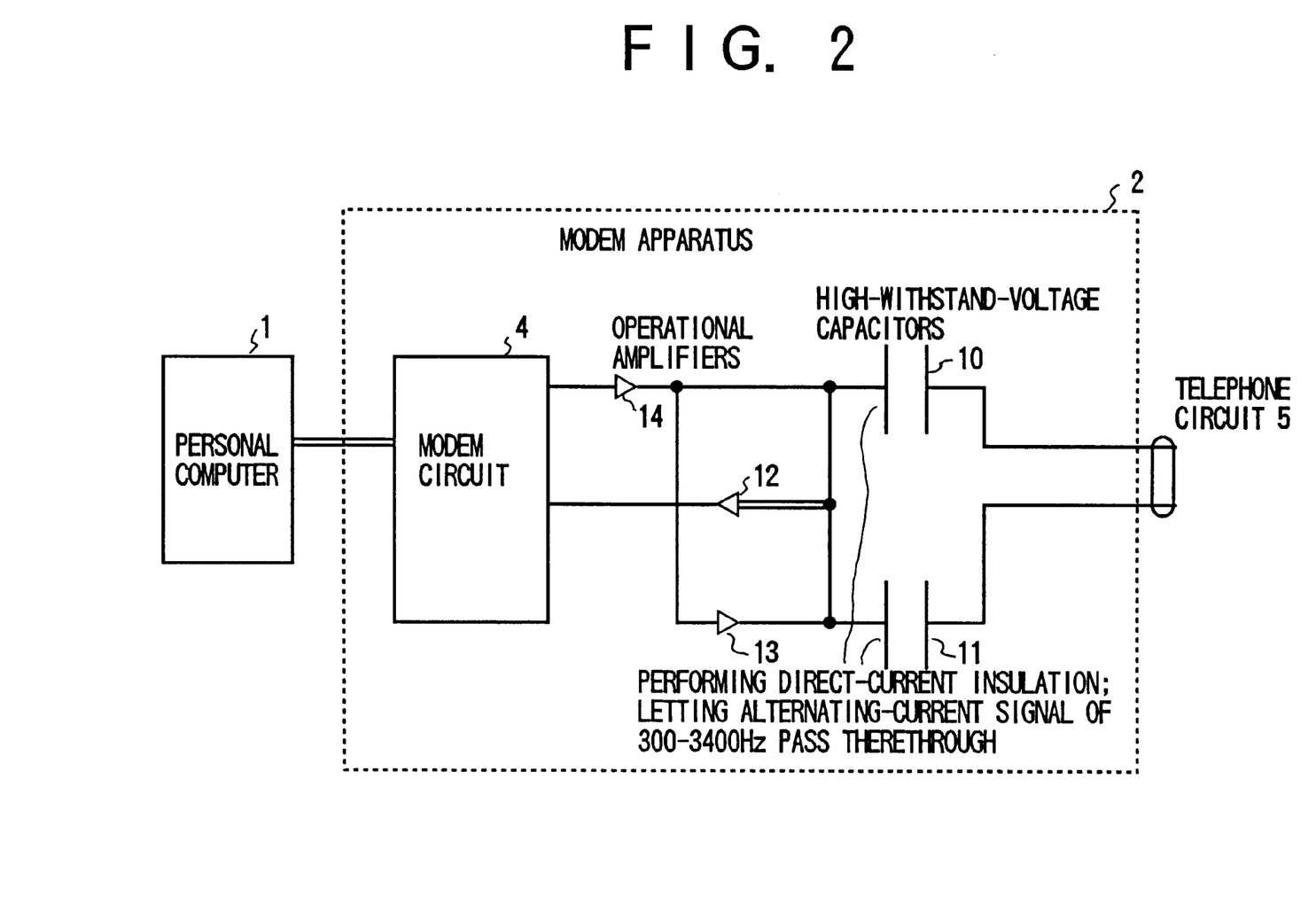
FIG. 2 illustrates an arrangement of a modem (wherein direct-current insulation is performed by capacitors) in the related art.

As a method for enabling miniaturization of such a modem apparatus, the applicant of the present application disclosed a method in Japanese Laid-Open Patent Application No.5-268372 utilizing high-withstand-voltage capacitors (capacitors which withstand a high voltage). FIG. 2 shows an example in which the direct-current insulation is performed by the high-withstand-voltage capacitors. A signal supplied from the personal computer 1 is transmitted to the telephone circuit 5 via the modem apparatus 2. The modem apparatus 2 includes the modem circuit 4, the high-withstand-voltage capacitors 10, 11, and operational amplifiers 12 through 14. In the modem apparatus 2, the capacitors 10, 11 are used for providing the necessary direct-current insulation.

The modem apparatus 2 shown in FIG. 1 includes the circuit transformer 3 which includes cores and coils. As a result, it is not possible to incorporate the modem apparatus 2 into an LSI (Large Scale Integration) circuit. Thus, there is a limit to the miniaturization of the modem apparatus 2.

The modem apparatus 2 shown in FIG. 2 does not need such a circuit transformer, and greatly contributes to thinning of the modem apparatus of PCMCIA (Personal Computer Memory Card International Association) or the like. However, when the modem circuit is used for the telephone circuit, it is necessary to transmit a sound signal of a low frequency equal to or lower than 300 Hz. Therefore, a capacitor having a large capacitance of several $\mu F$ is needed. As a result, there is a limit to the miniaturization of the modem apparatus, and, it is difficult to incorporate such a modem apparatus into one package.

SUMMARY OF THE INVENTION

An object of the present invention is to provide a modem apparatus in which direct-current insulation which withstands a high voltage is provided, to miniaturize the modem apparatus and to enable incorporating the modem apparatus into a single LSI package.

A modem apparatus 2, according to the present invention, which provide modulation and demodulation between a telephone circuit 5 and a terminal apparatus (personal computer 1), comprises:

a modem circuit 4;

a codec circuit 18 performing conversion between an analog signal and a digital signal;

wherein capacitors 16, 17 are provided between the modem circuit 4 and the codec circuit 18, a signal supplied from the terminal apparatus (personal computer 1) and a signal supplied from the codec circuit 18 being supplied to the modem circuit 4, and a signal supplied from the telephone circuit 5 and a signal supplied from the modem circuit 4 being supplied to the codec circuit 18.

In this arrangement, without using a circuit transformer, the direct-current insulation is provided by the capacitors 16, 17 each having a small capacitance and a high withstand voltage. As a result, the modem apparatus can be miniaturized while the direct-current insulation which withstands a high voltage is provided therein. Further, as a result of the capacitor 16 being provided in a displacement (i.e., a circuit processing a digital signal), it is easy to process the signal at points preceding and subsequent to the capacitor 16 as described below.

The modem apparatus may further comprise first and second converters 14, 15, wherein:

the first converter 14 converts a first digital signal, using a second digital signal, into a third digital signal, the frequency of the second digital signal being higher than the frequency of the first digital signal, and the frequency of the third digital signal being equal to or higher than the frequency of the second digital signal;

the second converter 15 reproduces the first digital signal from the third digital signal using the second digital signal; and the capacitor 16 is provided between the first and second converters 14, 15.

In this arrangement, the first converter 14 converts the first digital signal, using the second digital signal, into the third digital signal, the frequency of the second digital signal being higher than the frequency of the first digital signal, the frequency of the third digital signal being equal to or higher than the frequency of the second digital signal, and the second converter 15 reproduces the first digital signal from the third digital signal using the second digital signal. Thus, a signal of a low frequency is converted into a signal of a high frequency before being input to the capacitor 16. As a result, it is possible to use a capacitor having a small capacitance as the capacitor 16 for the direct-current insulation. Thus, even if the frequency of the first signal is low, it is possible to miniaturize the modem apparatus while direct-current insulation which withstands a high voltage is provided therein.

The second signal may be a clock signal generated by one of the terminal apparatus (personal computer 1), the modem circuit 4 and the codec circuit 18; and each of the first and second converters 14, 15 comprises an exclusive-OR circuit.

In this arrangement, it is possible to easily form the first converter using the clock signal and the exclusive-OR circuit.

A lowpass filter may be provided next to the second converter 15.

In this arrangement, by using the lowpass filter, it is possible to remove high-frequency noise which is generated when the first digital signal is reproduced.

A rectifying circuit 99 may be provided at a point at which the capacitor 16 is connected with one of the first and second converters 14, 15; and an output of the rectifying circuit 99 may be used as power supply for at least one of the first and second converters 14, 15 and the codec circuit 18.

In this arrangement, as a result of the output of the first converter 14 being rectified, a power supply is obtained, which power supply supplies power to at least one of the first and second converters 14, 15 and the codec circuit 18. Thereby, it is possible to eliminate or reduce a separate power supply for the modem apparatus 2.

The modem apparatus 2 may comprise an integrated circuit.

In this arrangement, it is possible to miniaturize the modem apparatus 2 so that the modem apparatus may be a built-in device of a personal computer.

A ringer-signal detecting circuit, according to another aspect of the present invention, comprises:

a differential amplifier 45 having signals of a going line 55 or 56 and a returning line 56 or 55 of a telephone circuit 5 input to the two input terminals thereof, respectively; and two capacitors 46, 47 each provided between a respective one the two input terminals of the differential amplifier 45 and a respective one of the going line 55 or 56 and the returning line 56 or 55 of the telephone circuit 5, wherein the output signal of the differential amplifier 45 is used as a ringer-signal detection signal.

In this arrangement, as a result of the two capacitors 46, 47 being provided between the two input terminals of the differential amplifier 45 and the going (i.e., output) line 55 or 56 and the returning (input) line 56 or 55 of the telephone circuit 5, respectively, it is possible to miniaturize the ringer-signal detecting circuit while the direct-current insulation which withstands a high voltage is performed between the ringer-signal detecting circuit and the telephone circuit 5.

A caller-ID-signal detecting circuit, according to another aspect of the present invention, comprises:

a differential amplifier 64 having signals of a going line 70 or 71 and a returning line 71 or 70 of a telephone circuit 5 input to the two input terminals thereof, respectively; and two capacitors 68, 69 each provided between a respective one of the two input terminals of the differential amplifier 64 and a respective one of the going line 70 or 71 and the returning line 71 or 70 of the telephone circuit 5, wherein the output signal of the differential amplifier 64 is used as a caller-ID-signal detection signal.

In this arrangement, as a result of the two capacitors 68, 69 being provided between the two input terminals of the differential amplifier 64 and the going line 70 or 71 and the returning line 71 or 70 of the telephone circuit 5, respectively, it is possible to miniaturize the caller-ID-signal detecting circuit while the direct-current insulation which withstands a high voltage is provided between the caller-ID-signal detecting circuit and the telephone circuit 5.

A hook-off/on control circuit 92, according to another aspect of the present invention, which controls a switch circuit 89 which is provided in one of a going line 90 or 91 and a returning line 91 or 90 of a telephone circuit 5 in series, and connects and disconnects the one of the going line 90 or 91 and the returning line 91 or 90 of the telephone circuit 5 through the switch circuit 89 in accordance with a hook-off signal, comprises:

an AND circuit 80 performing an operation so as to obtain the logical product of the hook-off signal and a clock signal;

a capacitor 81 removing the direct-current component of the signal of the logical product; and a rectifying circuit 84 reproducing the hook-off signal using the signal obtained as a result of the direct-current component of the signal of the logical product being removed by the capacitor, wherein:

the AND circuit 80, the capacitor 81 and the rectifying circuit 84 are connected in series; and the hook-off/on control circuit 92 opens and closes the switch circuit 89 in accordance with the reproduced hook-off signal.

In this arrangement, the AND circuit 80 provided the operation so as to obtain the logical product of the hook-off signal and the clock signal, the capacitor 81 removes the direct-current component of the signal of the logical product, and the rectifying circuit 84 reproduces the hook-off signal using the signal obtained as a result of the direct-current component of the signal of the logical product being removed by the capacitor, wherein the AND circuit 80, the capacitor 81 and the rectifying circuit 84 are connected in series in the stated order, and the hook-off/on control circuit 92 opens and closes the switch circuit 89 in accordance with the reproduced hook-off signal. As a result, it is possible to miniaturize the hook-off/on control circuit while the direct-current insulation which withstands a high voltage is provided between the hook-off/on control circuit 92 and the telephone circuit 5.

A modem LSI apparatus, according to another aspect of the present invention, comprises:

the above-described modem apparatus 2, ringer-signal detecting circuit and hook-off/on control circuit 92, wherein the modem apparatus 2, ringer-signal detecting circuit and hook-off/on control circuit 92 are contained in a single package.

In this arrangement, it is possible to provide the modem LSI apparatus in which the modem apparatus 2, ringer-signal detecting circuit and hook-off/on control circuit 92 are contained in the single package, and thus, to miniaturize the modem apparatus, ringer-signal detecting circuit and hook-off/on control circuit 92 as a whole while the direct-current insulation which withstands a high voltage is provided therein.

Other objects and further features of the present invention will become more apparent from the following detailed descriptions when read in conjunction with the accompanying drawings.

DETAILED DESCRIPTIONS OF THE PREFERRED EMBODIMENT

Figure 3:
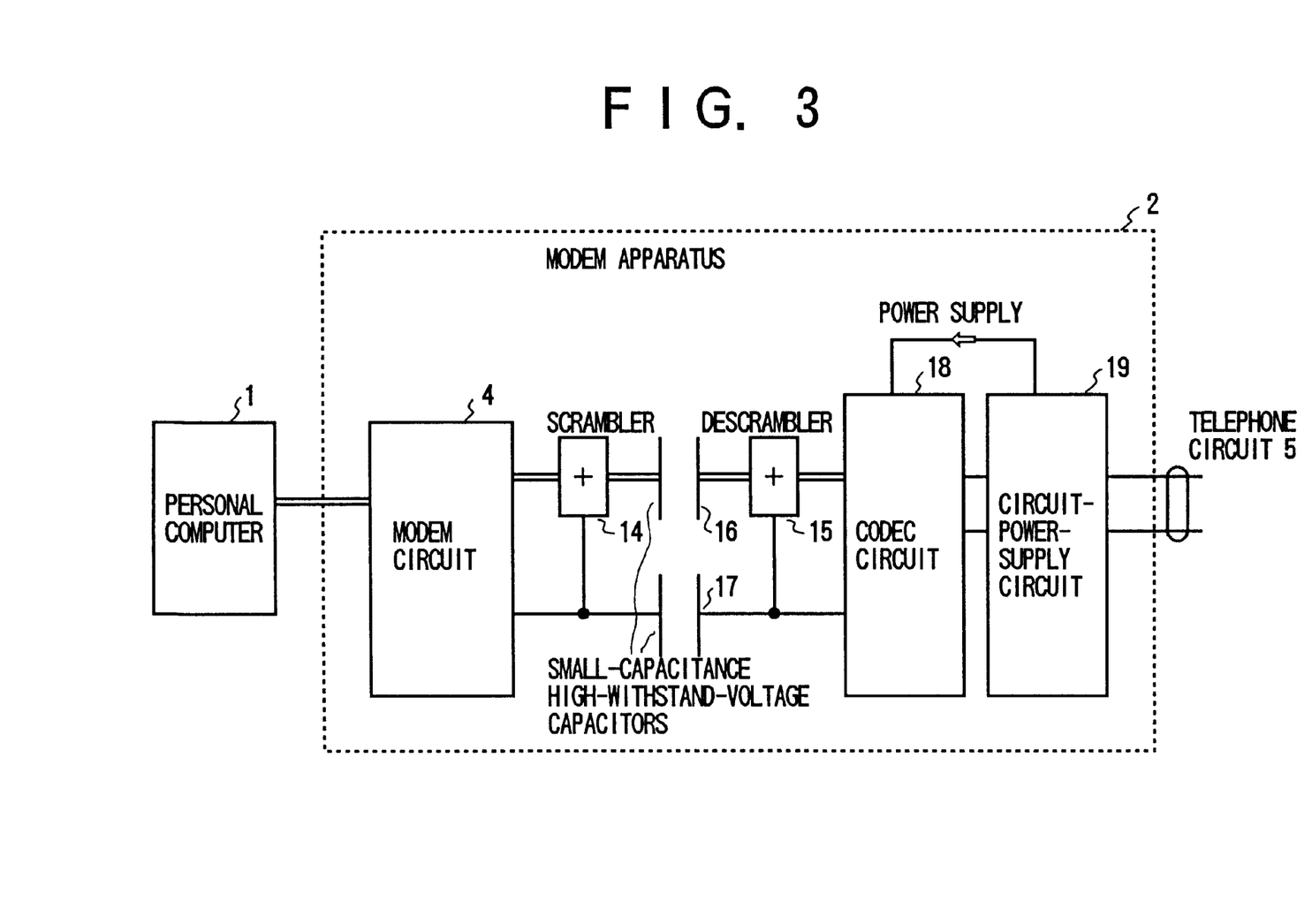
FIG. 3 illustrates the principle of one embodiment of the present invention (wherein direct-current insulation is performed by capacitors)

FIG. 3 shows one embodiment of the present invention. A digital signal supplied from a personal computer (terminal apparatus) 1 is converted by a modem apparatus 2 into a signal suitable for transmission thereof through a telephone circuit 5. The thus-obtained signal is sent to the telephone circuit 5. An analog signal supplied from the telephone circuit 5 is converted by the modem apparatus 2 into a digital signal which can be easily processed by the personal computer 1. The thus-obtained signal is sent to the personal computer 1.

The modem apparatus 2 includes a modem circuit 4, a scrambler 14, a descrambler 15, a codec circuit 18, a circuit-power-supply circuit 19 and small-capacitance high-withstand-voltage capacitors (capacitors each having a small capacitance and withstanding a high voltage) 16, 17. In FIG. 3, a circuit arrangement for sending the digital signal supplied from the personal computer 1 to the telephone circuit 5 is shown, but a circuit arrangement of scrambling and descrambling in a reverse signal flow, for sending the analog signal supplied from the telephone circuit 5 to the personal computer 1, is omitted.

The modem circuit 4 comprises a digital signal processor (DSP), and performs compression of amplitude-modulated data or phase-modulated data and so forth. Generally, the modem circuit 4 may comprise a DSP, 'MOTOROLADSP 5600' manufactured by Motorola Co., Ltd., or 'TEXASINSTRUMENTSDSP TMS320C5xDSP' manufactured by Texas Instruments Co., Ltd. The codec circuit 18 performs signal conversion between the analog signal and the digital signal. Generally, the codec circuit 18 may comprise a 'SIMPLIFIED ANALOG FRONT-END ST7546' manufactured by Thomson Co., Ltd. (SGS-THOMSON MICRO ELECTRONICS). The circuit-power-supply circuit 19 supplies power using an electric current flowing through the telephone circuit 5. Generally, the circuit-power-supply circuit 19 may comprise a speech network IC 'BA8216' manufactured by Rohm Co., Ltd.

The digital signal supplied from the personal computer 1 is supplied to the scrambler 14 via the modem circuit 4. The scrambler 14 scrambles the thus-supplied signal using a clock signal. Thus, the signal supplied to the scrambler 14 is converted into a signal of a high frequency, by the scrambler 14. The thus-obtained digital signal of the high frequency passes through the capacitor 16. Then, the descrambler 15 descrambles the digital signal of the high frequency so as to reproduce the original digital signal using the clock signal. The thus-reproduced digital signal is converted into the analog signal, by the codec circuit 18, and then, is sent to the telephone circuit 5.

Signals which maintain the same polarity during a long period such as 'chip select', 'frame signal' and so forth may be transmitted between the modem circuit 4 and the codec circuit 18. These signals of low frequencies cannot pass through the capacitor 16 as they are. In the modem apparatus 2 in the embodiment of the present invention, these signals are scrambled by using the clock signal so as to be converted into signals of high frequencies. As a result, these signals can pass through the capacitor 16. Thus, in the modem apparatus 2 in the embodiment of the present invention, without using a circuit transformer such as the circuit transformer 3 shown in FIG. 1, but instead using the small-capacitance high-withstand-voltage capacitor 16, the direct-current insulation which withstands a high voltage is provided between the personal computer 1 and the telephone circuit 5. Further, it is possible to miniaturize the modem apparatus 2 because the capacitance of the capacitor 16 is small.

In the embodiment shown in FIG. 3, the scrambler 14 and descrambler 15 are used. However, it is not necessary to be limited to them. Any other circuits which convert a digital signal of a low frequency into a digital signal of a high frequency, and returns the digital signal of the high frequency into the digital signal of the low frequency can be used instead the scrambler 14 and descrambler 15. For example, general logic circuits such as simple AND (logical product) circuits, exclusive-OR circuits or the like can be used as the scrambler 14 and descrambler 15.

Figure 4:
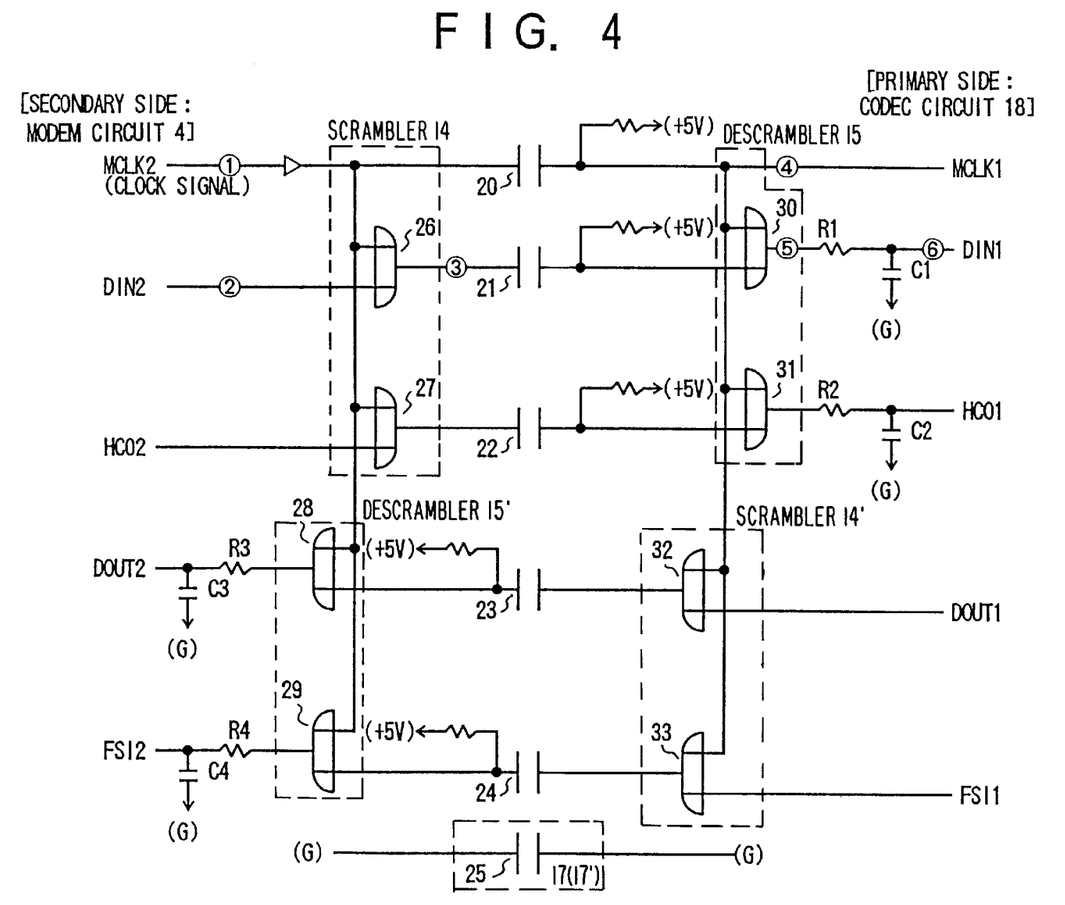
FIG. 4 shows a circuit diagram of a portion for transmitting a modulated signal and a demodulated signal in the present invention.
Figure 5:
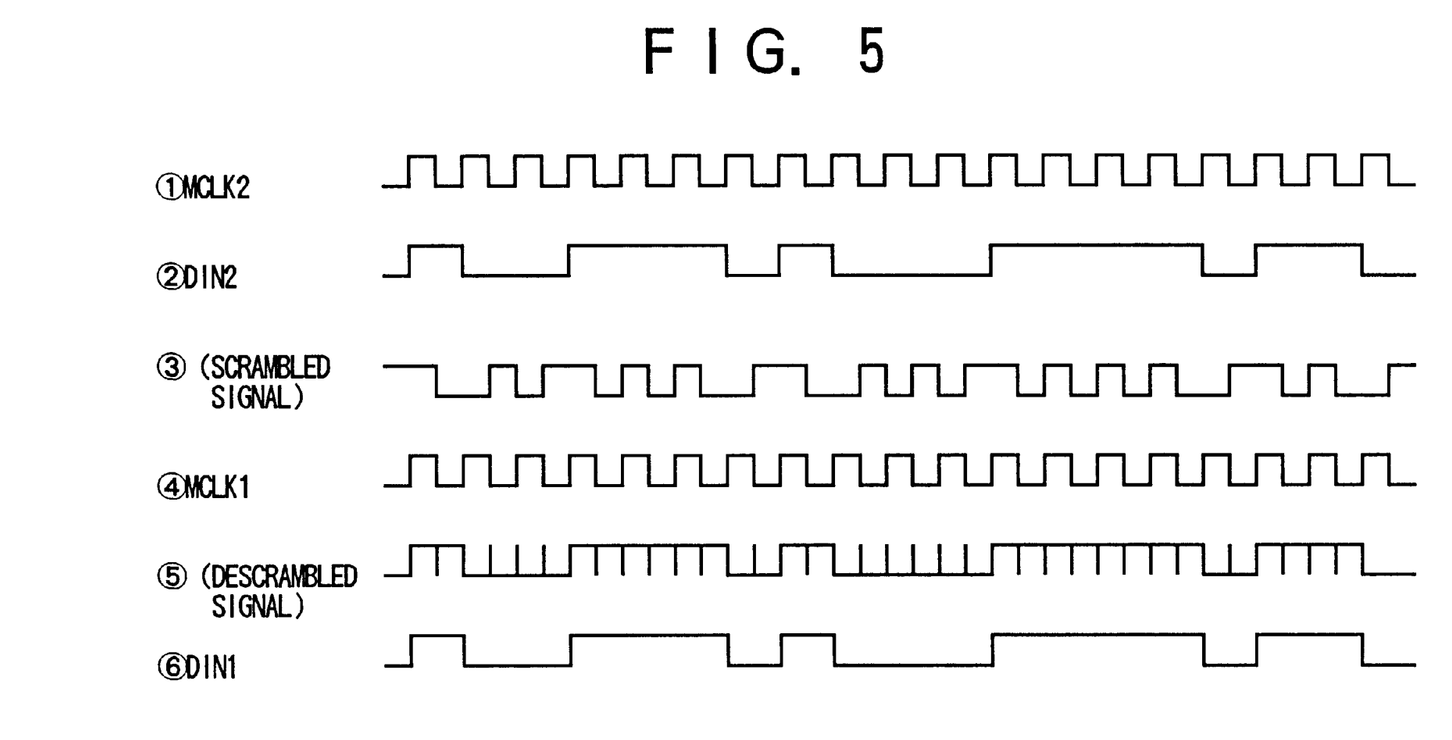
FIG. 5 shows waveforms of signals flowing through the circuit shown in FIG. 4.

FIG. 4 shows a detailed arrangement of the scrambler 14, descrambler 15 and small-capacitance high-withstand-voltage capacitors 16, 17 provided between the codec circuit 18 and the modem circuit 4 for sending digital signals in the path from the modem circuit 4 to the codec circuit 18, the reverse path including corresponding such components, but in the reverse order and identified by the same, but primed, numerals in the modem apparatus in the embodiment of the present invention. FIG. 5 shows waveforms of signals in the circuit shown in FIG. 4. The waveforms ①, ②, ③, ④, ⑤, and ⑥ shown in FIG. 5 are those of signals flowing through the lines ①, ②, ③, ④, ⑤ and ⑥ shown in FIG. 4, respectively.

In FIG. 4, the left side corresponds to a secondary side, that is, the modem circuit 4, and the right side corresponds to a primary side, that is, the codec circuit 18. Capacitors 20 through 24 for performing the direct-current insulation are provided between the modem circuit 4 and the codec circuit 18. Each of circuits 26 through 33 comprises an exclusive-OR circuit as a general logic circuit. Resistors R1 through R4 and capacitors C1 through C4 act as lowpass filters, respectively. Clock signals MCLK2 and MCLK1 are used for the scrambling operation and the descrambling operation. Such clock signals may be generated by any of the personal computer 1, the modem circuit 4 and the codec circuit 18. A signal DIN2 is a signal supplied from the personal computer 1, and is a digital signal which has not undergone the digital-to-analog conversion. A signal DOUT1 is a signal supplied from the telephone circuit 5, and is a digital signal which is obtained as a result of the analog-to-digital conversion being performed on an analog signal supplied from the telephone circuit 5. Signals HCO1 and HCO2 are signals such as 'chip select' and so forth. Circuits for such signals are not mandatory ones. Signals FSI1 and FSI2 are signals such as a 'frame signal' and so forth. The direct-current insulation is performed in each of all the circuits for the above-mentioned signals and a circuit of the ground (G), by the capacitors 20 through 24 and a capacitor 25.

With reference to FIGS. 4 and 5, the exclusive-OR circuit (scrambling circuit) 26 performs an exclusive-OR operation on the signal DIN2 ② and the clock signal MCLK2 ① of a frequency, for example, on the order of 1 MHz, and inverts the result of the thus-performed exclusive-OR operation. As a result, the signal ③ is obtained. The frequency of the signal ③ is equal to or higher than the frequency of the clock signal MCLK2 ①. In the case shown in FIG. 5, the signal DIN2 ② and the clock signal ① are synchronized with one another. As a result, the frequency of the signal ③ is the same as the frequency of the clock signal MCLK2 ①. However, in a case where the signal DIN2 ② and the clock signal ① are not synchronized with one another, the frequency of the signal ③ is higher than the frequency of the clock signal MCLK2 ①. The signal ③ is supplied to the capacitor 21 so as to undergo the direct-current insulation. The exclusive-OR circuit (descrambling circuit) 30 performs an exclusive-OR operation on the signal ③, which has passed through the capacitor 21, and the clock signal MCLK1 ④, and inverts the result of thus-performed exclusive-OR operation. Thus, a signal ⑤ is obtained. As shown in FIG. 5, the signal ⑤ includes noise like whiskers. Such noise is removed through the lowpass filter including the resistor R1 and the capacitor C1. As a result, the original digital signal DIN1 ① is obtained. Similarly, the digital signal HCO2 is transmitted from the modem circuit 4 to the codec circuit 18 through the scrambling circuit 27, capacitor 22 and descrambling circuit 31, wherein the direct-current insulation is performed. Thus, in the arrangement shown in FIG. 4, the frequency of each signal to be transmitted is increased by using the clock signal, and then, the thus-obtained signal is supplied to the respective capacitor. Thereby, capacitors each having a small capacitance can be used as the capacitors for the direct-current insulation. For example, while the capacitor of 1 μF is used in the above-described related art, a capacitor of approximately 50 pF can be used as each capacitor for the direct-current insulation in the embodiment of the present invention in the case where the frequency of the clock signal MCLK2 is on the order of 1 MHz.

Similarly, the signal DOUT1 is transmitted from the codec circuit 18 to the modem circuit 4 through the scrambling circuit 32, capacitor 23 and descrambling circuit 28, wherein the direct-current insulation is performed. The signal FSI1 is transmitted from the codec circuit 18 to the modem circuit 4 through the scrambling circuit 33, capacitor 24 and descrambling circuit 29, wherein the direct-current insulation is performed.

Figure 6:
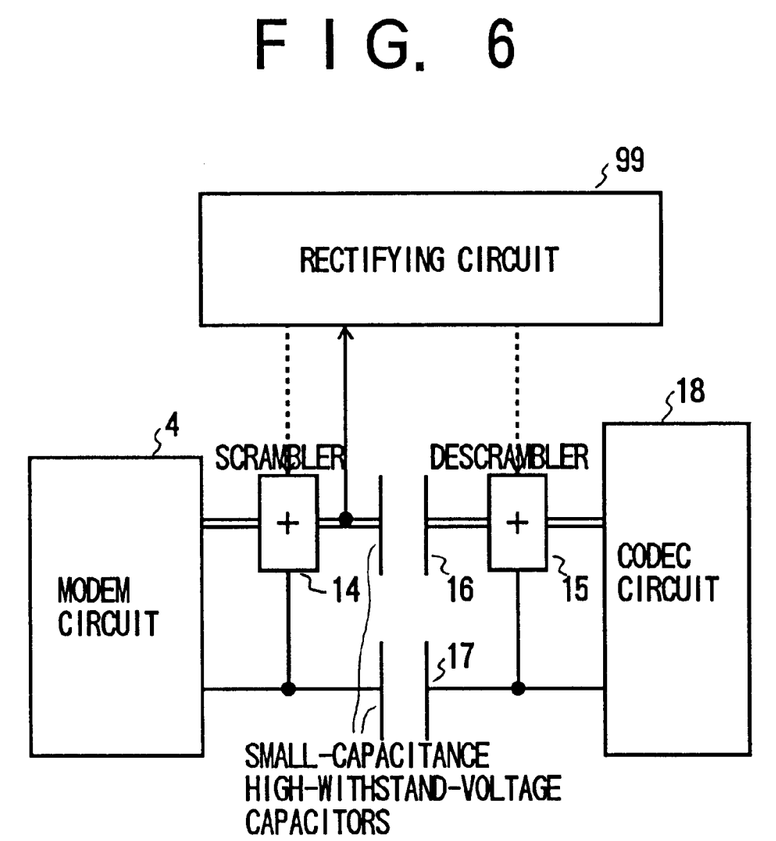
FIG. 6 illustrates a power-supply generating arrangement.

FIG. 6 shows a portion of the modem apparatus 2 in the embodiment of the present invention, in which a rectifying circuit 99 is provided. The rectifying circuit 99 uses the digital signal which has undergone the scrambling operation performed by the scrambler 14. The rectifying circuit 99 rectifies this digital signal and a signal obtained from the rectification is used as a power supply for the scrambler 14 and the descrambler 15. In the arrangement shown in FIG. 6, the rectifying circuit 99 is connected with a point, or node, at which the scrambler 14 and the capacitor 16 are connected with one another. However, instead, it is also possible that the rectifying circuit 99 is connected with a point, or node, at which the descrambler 15 and the capacitor 16 are connected with one another. Further, in the arrangement shown in FIG. 6, the rectifying circuit 99 supplies power to the scrambler 14 and the descrambler 15. However, it is possible that the rectifying circuit 99 supplies power to the scrambler 14, the descrambler 15 and the codec circuit 18.

Figure 7:
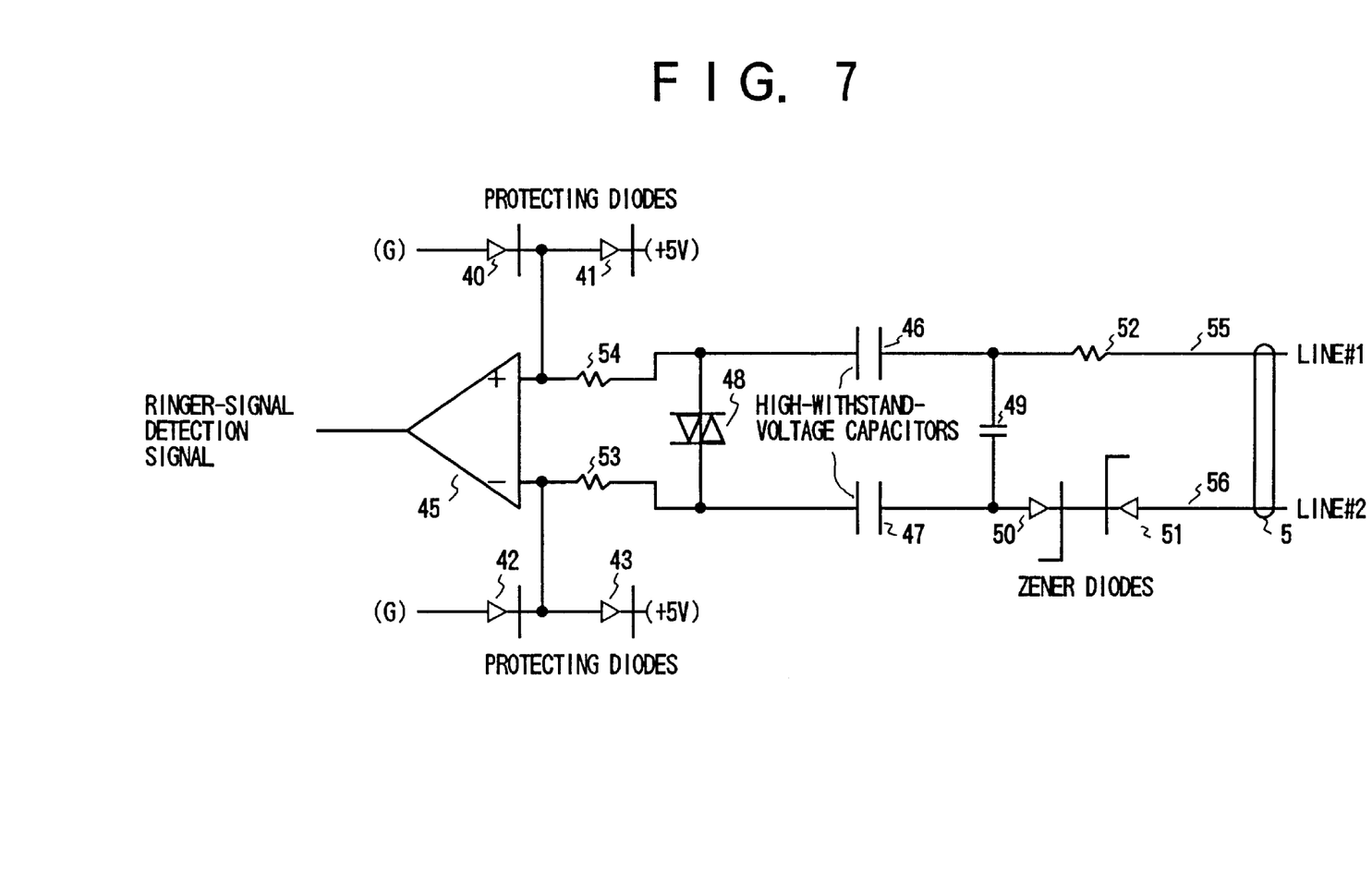
FIG. 7 shows a circuit diagram of a ringer-signal detecting circuit.

FIG. 7 shows a ringer-signal (16 Hz, 85 V) detecting circuit in which the direct-current insulation between the personal computer 1 or the modem apparatus 2 and the telephone circuit 5 (lines 55 (#1), 56 (#2)) is performed. The direct-current insulation is performed by capacitors 46 and 47. Each of Zener diodes 50 and 51 has a Zener voltage on the order of 35 V. Small signals do not pass through the Zener diodes 50 and 51, and a large signal such as a ringer signal passes through the Zener diodes 50 and 51. A circuit 48 includes two diodes which are connected in parallel in a manner in which the anode of one diode is connected with the cathode of the other diode and the cathode of the one diode is connected with the anode of the other diode. This circuit 48 is used to keep a voltage, which has a value more than a predetermined value, between the two going and returning lines. Protecting diodes 40 through 43 are used for protecting a differential amplifier 45.

A ringer signal appearing in the telephone circuit 55 (#1), 56 (#2) is detected by the differential amplifier 45. As a result, the differential amplifier 45 outputs a ringer-signal detection signal. The direct-current insulation is performed between the telephone circuit 55 (#1), 56 (#2) and the output of the differential amplifier 45 by the capacitors 46 and 47.

Figure 8:
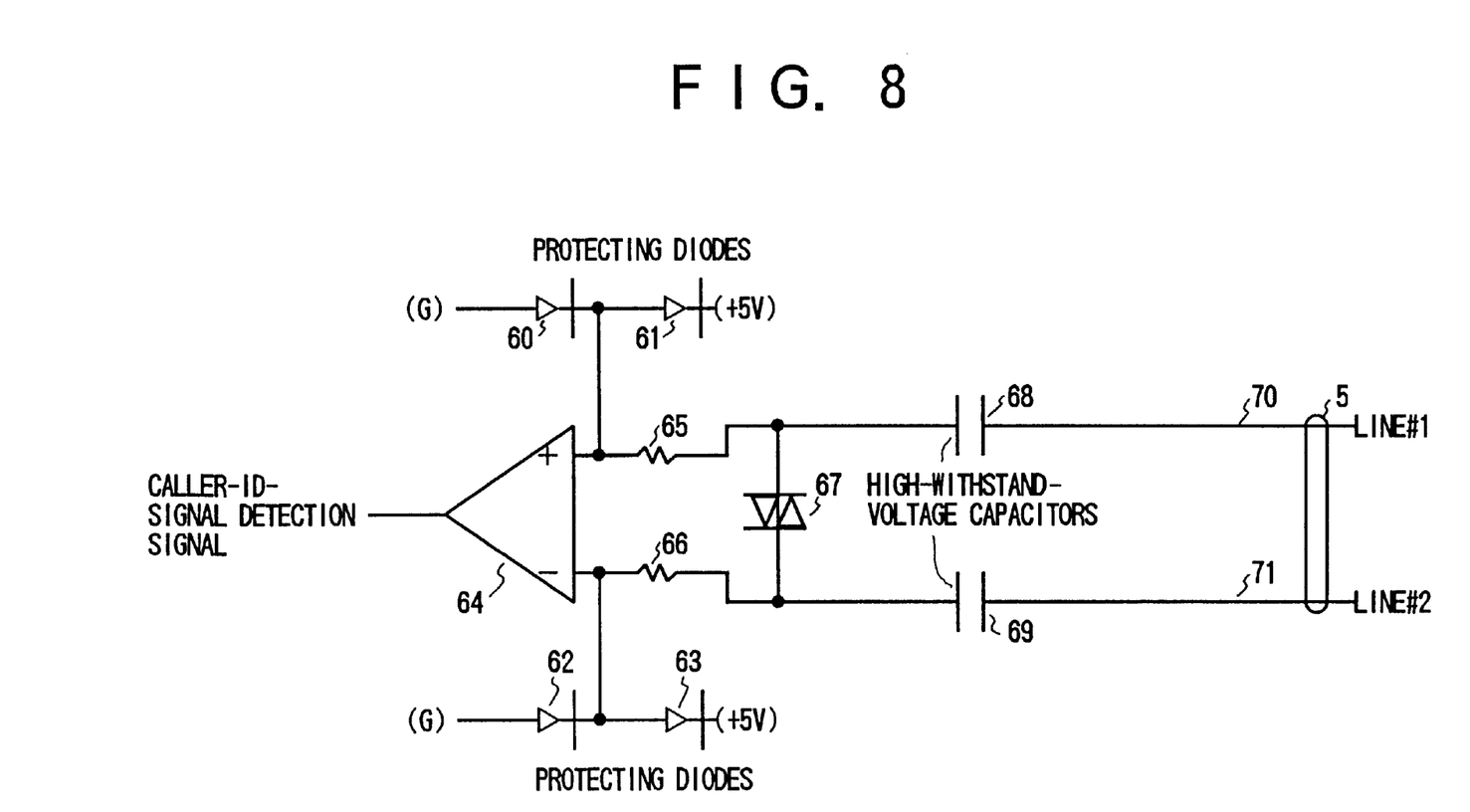
FIG. 8 shows a circuit diagram of a caller-ID-signal detecting circuit.

FIG. 8 shows a caller-ID-signal detecting circuit in which the direct-current insulation between the personal computer 1 or the modem apparatus 2 and the telephone circuit 5 (70 (#1), 71 (#2)) is performed. The direct-current insulation is performed by capacitors 68 and 69. A circuit 67 including two diodes which are connected in parallel in a manner in which the anode of one diode is connected with the cathode of the other diode and the cathode of the one diode is connected with the anode of the other diode. This circuit 67 is used to keep a voltage, which has a value more than a predetermined value, between the going and returning lines. Protecting diodes 60 through 63 are used for protecting a differential amplifier 64.

A caller-ID signal appearing in the telephone circuit 70 (#1), 71 (#2) is detected by the differential amplifier 64. As a result, the differential amplifier 64 outputs a caller-ID-signal detection signal. The direct-current insulation is performed between the telephone circuit 70 (#1), 71 (#2) and the output of the differential amplifier 64 by the capacitors 68 and 69.

Figure 9:
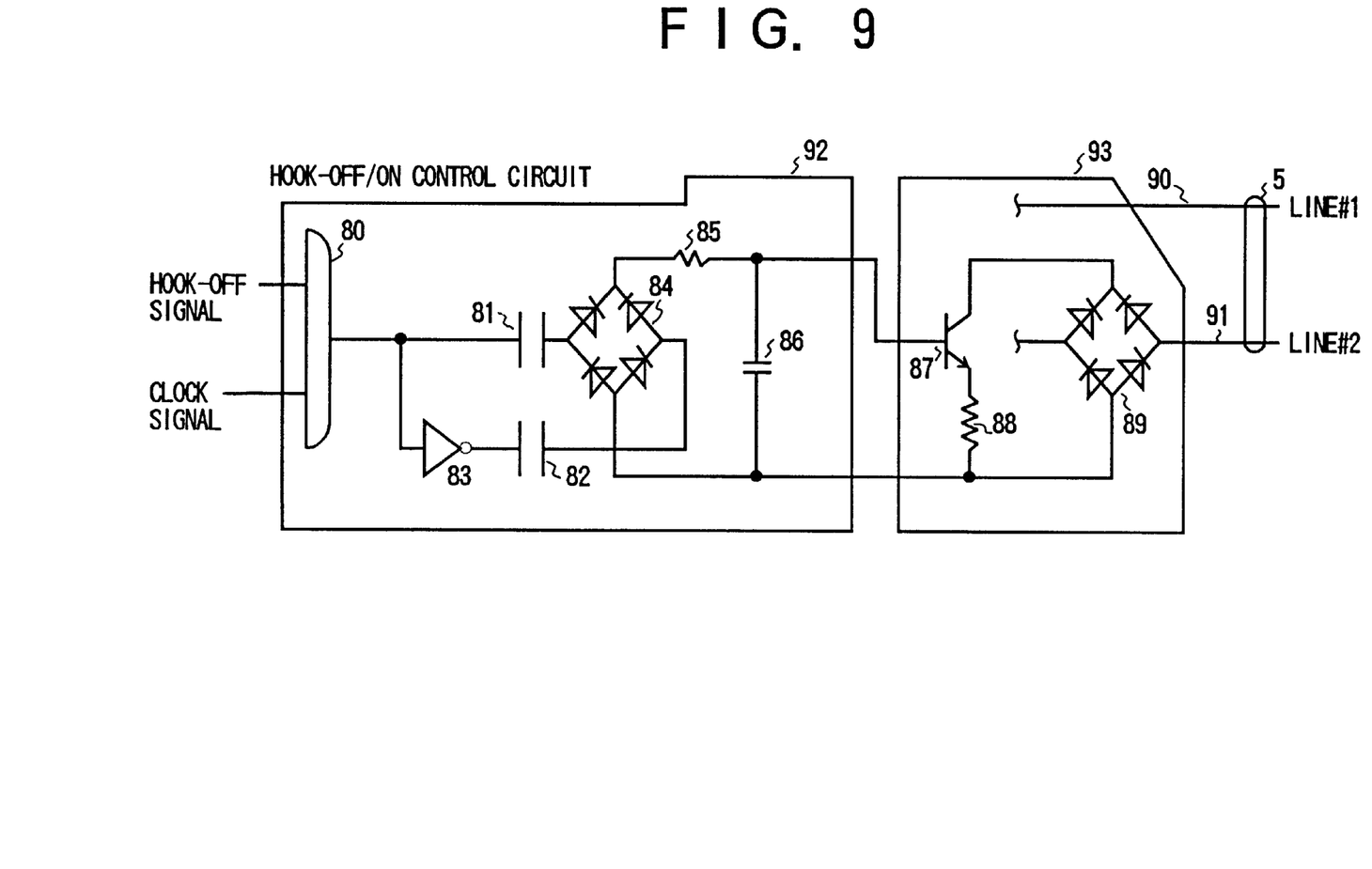
FIG. 9 shows a circuit diagram of a hook-off/on control circuit.

FIG. 9 shows a hook-off/on control circuit 92 and a circuit disconnecting circuit 93 which is controlled by the hook-off/on control circuit 92. In the circuit disconnecting circuit 93, a transistor 87 is turned on and turned off so that a switching circuit 89 is controlled. Thereby, one of the going line #1 or #2 and the returning line #2 or #1 of the circuit 5 is disconnected. The hook-off/on control circuit 92 includes capacitors 81, 82 for providing the direct-current insulation, an inverted amplifier 83, a rectifying circuit 84 (diode bridge for full-wave rectifying of an alternating-current signal), and a resistor 85 and capacitor 86 which act as a lowpass filter.

The hook-off/on control circuit 92 directly disconnects the modem apparatus 2 from the telephone circuit 5. The capacitors 81, 82 perform the direct-current insulation between the telephone circuit 5 and the modem apparatus 2 or the personal computer 1. An AND circuit 80 performs an operation so as to obtain the logical product of the hook-off signal and the clock signal. The signal resulting from the logical product operation is supplied to the rectifying circuit 84 which then multiplies the signal resulting from the logical product operation and the signal obtained from inverting and delaying the signal resulting from the logical product operation (delay detection). Then, a high-frequency component of the signal resulting from the delay detection is removed by the lowpass filter (the resistor 85 and capacitor 86). Thus, the original hook-off signal is obtained. The thus-obtained hook-off signal controls the transistor 87 so as to connect and disconnect the line #2 of the telephone circuit 5.

In each of the above-described ringer-signal detecting circuit shown in FIG. 7, the caller-ID-signal detecting circuit shown in FIG. 8 and the hook-off/on control circuit 92 shown in FIG. 9, the respective capacitors perform the direct-current insulation between the telephone circuit 5 and the modem apparatus 2 or the personal computer 1. Each of these circuits does not use a circuit transformer such as the circuit transformer 3 shown in FIG. 1. As a result, it is possible to incorporate these circuits together with the modem apparatus 2 into one package of an LSI circuit.

Figure 11:
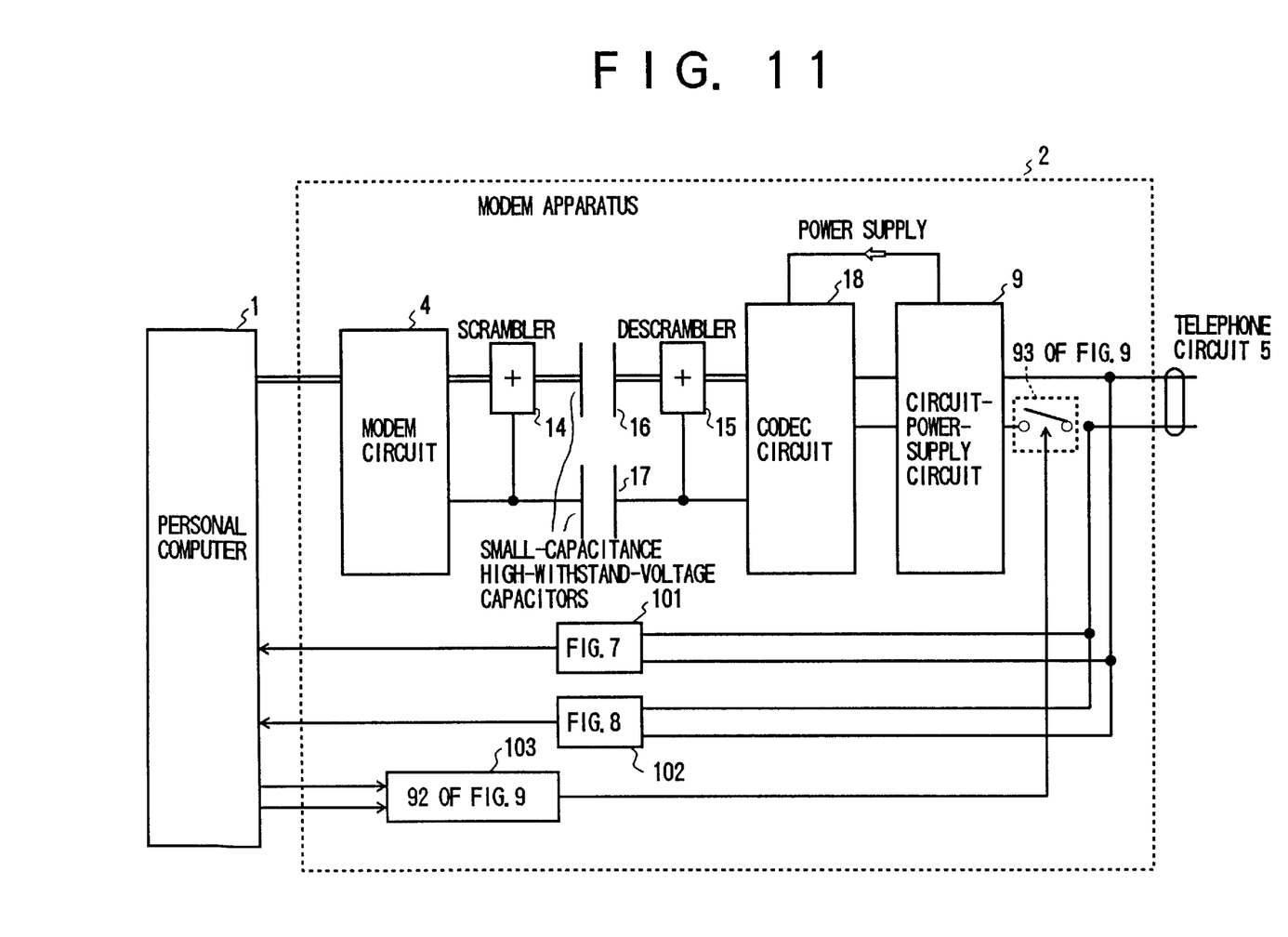
FIG. 11 illustrates one package of a modem LSI apparatus.

FIG. 11 shows the modem apparatus 2 including the modem circuit 4, the codec circuit 18, the circuit-power-supply circuit 19, the scrambler 14, the descrambler 15, the small-capacitance high-withstand-voltage capacitors 16, 17, the ringer-signal detecting circuit 101 (shown in FIG. 7), the caller-ID-signal detecting circuit 102 (shown in FIG. 8), the hook-off/on control circuit 92 and the circuit disconnecting circuit 93 (shown in FIG. 9), where the modem apparatus 2 is incorporated into one package of an LSI circuit.

Figure 10:
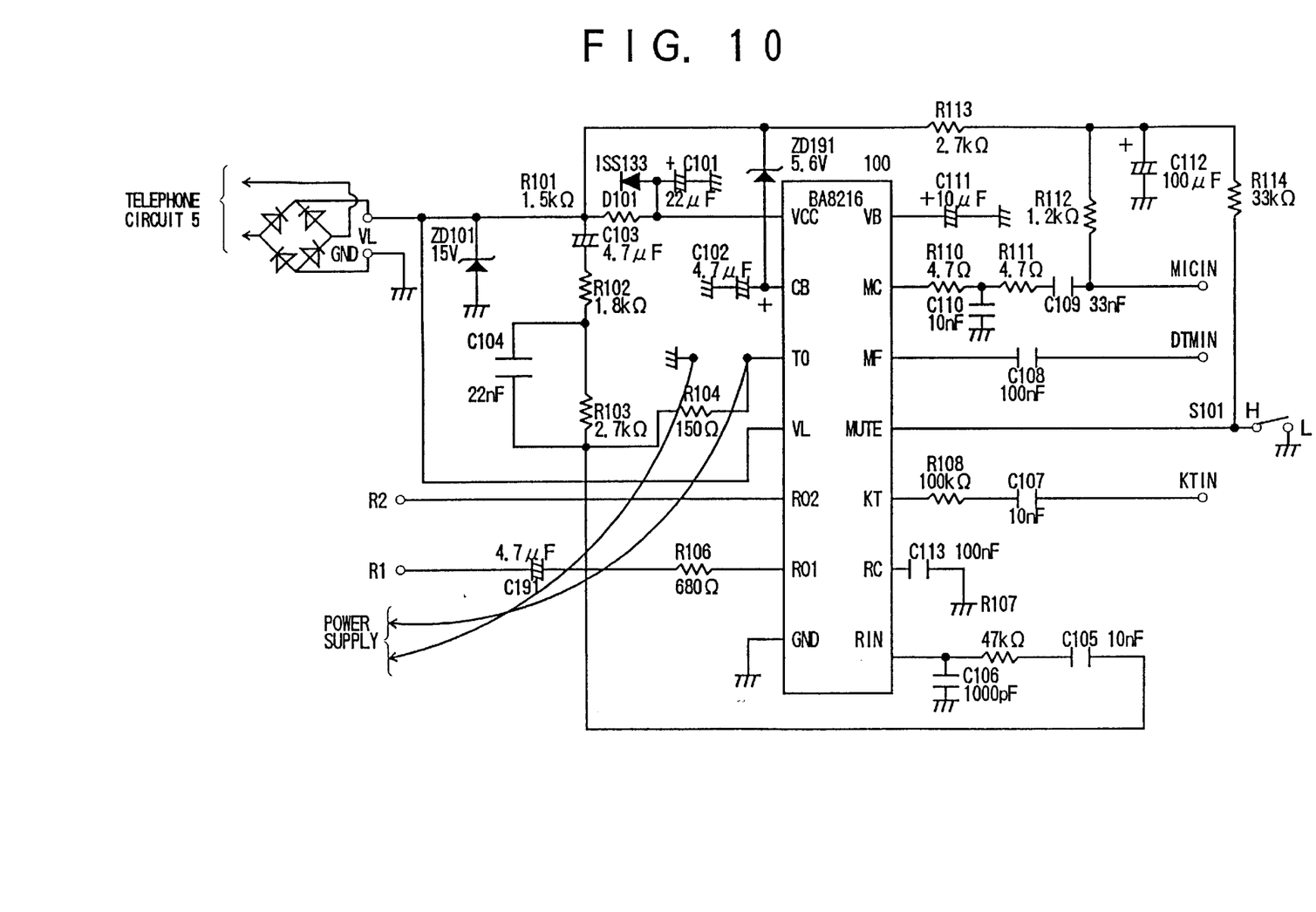
FIG. 10 illustrates a circuit-power-supply circuit.

FIG. 10 shows a specific circuit of one example of the circuit-power-supply circuit 19 shown in FIGS. 3 and 11. In this example, the circuit-power-supply circuit 19 uses the above-mentioned speech network IC 'BA8216' manufactured by Rohm Co., Ltd. The voltage of the telephone circuit 5 is rectified and then is applied to the VCC terminal of this IC, and power supply is obtained from the TO terminal of this IC. The telephone circuit 5 is also connected with the codec circuit 18 although it is omitted in FIG. 11.

Further, the present invention is not limited to the above-described embodiment, and variations and modifications may be made without departing from the scope of the present invention.

The contents of the basic Japanese Patent Application No.9-351672, filed on Dec. 19, 1997, are hereby incorporated by reference.

What is claimed is:

1. A modem apparatus which performs modulation and demodulation between a telephone circuit and a terminal apparatus, comprising:
    a modem circuit;
    a codec circuit performing conversion between an analog signal and a digital signal;
    plural capacitors provided between said modem circuit and said codec circuit;
    a first converter converting a first digital signal supplied from one of said terminal apparatus and said telephone circuit after being converted from an analog signal, using a second digital signal, into a third digital signal, the frequency of the second digital signal being higher than the frequency of the first digital signal and the frequency of the third digital signal being equal to or higher than the frequency of the second digital signal;
    a second converter reproducing the first digital signal from the third digital signal using the second digital signal; and
    a digital signal supplied from said terminal apparatus and a digital signal supplied from said codec circuit being supplied to said modem circuit, and an analog signal supplied from said telephone circuit and a digital signal supplied from said modem circuit being supplied to said codec circuit, one of said capacitors is provided between said first and second converters.

2. The modem apparatus, according to claim 1, wherein:
    the second digital signal is a clock signal generated by one of said terminal apparatus, said modem circuit and said codec circuit; and
    each of said first and second converters comprises an exclusive-OR circuit.

3. The modem apparatus according to claim 2, wherein:
    a rectifying circuit is connected at a point at which said one of said capacitors is connected with one of said first and second converters; and
    an output of said rectifying circuit is used as a power supply for at least one of said first and second converters and said codec circuit.

4. The modem apparatus according to claim 2, wherein a lowpass filter is connected to an output of said second converter.

5. The modem apparatus according to claim 1, wherein a lowpass filter is connected to an output of said second converter.

6. The modem apparatus according to claim 1, wherein:
    a rectifying circuit is connected at a point at which said one of said capacitors is connected with one of said first and second converters; and
    an output of said rectifying circuit is used as a power supply for at least one of said first and second converters and said codec circuit.

7. A hook-off/on control circuit, which controls a switch circuit which is provided in one of going and returning lines of a telephone circuit in series, and connects and disconnects said one of said going and returning lines of said telephone circuit through said switch circuit in accordance with a hook-off signal, comprising:
    an AND circuit performing an operation so as to obtain the logical product of the hook-off signal and a clock signal;
    a capacitor removing the direct-current component of the signal of the logical product; and
    a rectifying circuit reproducing the hook-off signal using the signal obtained as a result of the direct-current component of the signal of the logical product being removed by said capacitor,
    wherein:
        said AND circuit, said capacitor and said rectifying circuit are connected in series; and
        said hook-off/on control circuit opens and closes said switch circuit in accordance with the reproduced hook-off signal.

8. A modem LSI apparatus comprising:
a modem apparatus, which performs modulation and demodulation between a telephone circuit and a terminal apparatus, comprising:
   a modem circuit; and
   a codec circuit performing conversion between an analog signal and a digital signal;
   wherein capacitors are provided between said modem circuit and said codec circuit, a signal supplied from said terminal apparatus and a signal supplied from said codec circuit being supplied to said modem circuit, and a signal supplied from said telephone circuit and a signal supplied from said modem circuit being supplied to said codec circuit;
a ringer-signal detecting circuit comprising:
   a differential amplifier having the signals of the going and returning lines of a telephone circuit input to the two input terminals thereof, respectively; and
   two capacitors each provided between a respective one of said two input terminals of said differential amplifier and a respective one of said going and returning lines of said telephone circuit,
   wherein the output signal of said differential amplifier is used as a ringer-signal detection signal; and
a hook-off/on control circuit, which controls a switch circuit which is provided in one of going and returning lines of a telephone circuit in series, and connects and disconnects said one of said going and returning lines of said telephone circuit through said switch circuit in accordance with a hook-off signal, comprising:
   an AND circuit performing an operation so as to obtain the logical product of the hook-off signal and a clock signal;
   a capacitor removing the direct-current component of the signal of the logical product; and
   a rectifying circuit reproducing the hook-off signal using the signal obtained as a result of the direct-current component of the signal of the logical product being removed by said capacitor,
wherein:
   said AND circuit, said capacitor and said rectifying circuit are connected in series; and
   said hook-off/on control circuit opens and closes said switch circuit in accordance with the reproduced hook-off signal, and wherein said modem apparatus, said ringer-signal detecting circuit and said hook-off/on control circuit are contained in a single package.

9. A modem apparatus which performs modulation and demodulation between a telephone circuit and a telephone apparatus, comprising:
   a modem circuit connected to the terminal apparatus;
   a codec circuit connected to the telephone circuit;
   a first transmission path comprising a scrambler, a coupling capacitor and a descrambler, through which a digital output signal of the modem circuit is supplied to the codec circuit;
   a second signal transmission signal path comprising a scrambler, a coupling capacitor and a descrambler through which a digital signal output of the codec circuit supplied to the modem circuit; and
   in each of the first and second signal transmission paths, the respective first converters converting a first digital signal, using a second digital signal, into a third digital signal, the frequency of the second digital signal being higher than the frequency of the first digital signal and the frequency of the third digital signal being higher than the frequency of the second digital signal and the third digital signal being coupled by the coupling capacitor; and the respective second converters reproducing the first digital signal from the third digital signal, using the second digital signal.

10. The modem apparatus, according to claim 9, wherein:
   the second digital signal is a clock signal generated by one of said terminal apparatus, said modem circuit and said codec circuit; and
   each of the scramblers and descramblers of the first and second signal transmission paths comprises an exclusive-OR circuit.

11. The modem apparatus as claimed in claim 9, further comprising:
   in each of the signal transission paths, a rectifying circuit is connected at a point at which said respective coupling capacitor is connected with one of the respective scrambler and descrambler and an output of said respective rectifying circuit is used as a power supply for at least one of said respective scrambler, descrambler and codec circuit.

* * * * *